US010015023B2

(12) United States Patent
Shih (10) Patent No.: US 10,015,023 B2
(45) Date of Patent: Jul. 3, 2018

(54) HIGH-BANDWIDTH CHASSIS AND RACK MANAGEMENT BY VLAN (71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 234 days.

(21) Appl. No.: 14/686,267

(22) Filed: Apr. 14, 2015

(65) Prior Publication Data
US 2016/0072642 A1    Mar. 10, 2016

Related U.S. Application Data (60) Provisional application No. 62/047,556, filed on Sep. 8, 2014.

(51) Int. Cl.
H04L 12/46 (2006.01)
H04L 12/741 (2013.01)
H04L 12/24 (2006.01)

(52) U.S. Cl.
CPC ...... *H04L 12/4666* (2013.01); *H04L 41/0213* (2013.01); *H04L 41/0226* (2013.01); *H04L 41/04* (2013.01); *H04L 45/745* (2013.01)

(58) Field of Classification Search
None
See application file for complete search history.

(56) References Cited

U.S. PATENT DOCUMENTS

| 2007/0165603 | A1* | 7/2007 | Yokobori | H04L 12/4645 370/352 |
| 2007/0234419 | A1* | 10/2007 | Shouno | H04L 63/083 726/15 |
| 2009/0262741 | A1* | 10/2009 | Jungck | H04L 29/12066 370/392 |
| 2012/0287936 | A1* | 11/2012 | Biswas | H04L 49/70 370/395.3 |
| 2012/0294192 | A1* | 11/2012 | Masood | H04L 12/4645 370/255 |
| 2012/0307627 | A1* | 12/2012 | Oyamada | H04L 41/0668 370/225 |
| 2013/0304903 | A1* | 11/2013 | Mick | H04L 43/0817 709/224 |

(Continued)

FOREIGN PATENT DOCUMENTS

CN    102780608 A    11/2012

OTHER PUBLICATIONS

Taiwanese Office Action No. 104125259 for Application No. 10521504540 dated Dec. 7, 2016 w/ English First Office Action Summary.

*Primary Examiner* — Benjamin Lamont
(74) *Attorney, Agent, or Firm* — Nixon Peabody LLP; Eduardo J. Quiñones; Zhou Lu (57) ABSTRACT

Embodiments generally relate to remote computer network management. The present technology discloses techniques that can enable a high-bandwidth server management method by applying VLAN (Virtual Local Area Network). It employs an optimized RMCP protocol using a dual-pathway VLAN mechanism for data transmission either internal or external to a server rack. The present technology may enable a network computing device to perform the optimized RMCP protocol.

15 Claims, 7 Drawing Sheets

(56) References Cited

U.S. PATENT DOCUMENTS

2014/0119354 A1\* 5/2014 Verma ................ H04L 12/4633
370/338
2016/0072733 A1\* 3/2016 Murray ................ H04L 49/351
370/395.53

\* cited by examiner

HIGH-BANDWIDTH CHASSIS AND RACK MANAGEMENT BY VLAN

RELATED APPLICATIONS

This application claims priority to U.S. provisional application 62/047,556, filed Sep. 8, 2014, and entitled "Intra-Rack trust Network Configuration for IPMI over Non-Authentication RMCP", the disclosure of which is hereby incorporated herein by reference in its entirety for all purposes.

FIELD OF THE INVENTION

The disclosure relates generally to remote computer network management.

BACKGROUND

Remote server management in a high-density server system is important but remains challenging. For example, a data center often has a complex network topology. It generally comprises a large number of rack servers each having many servers, in which each server has its independent CPU, network interface, or operation system. To effectively monitor and manage a data center, the server management system requires an efficient and reliable network mechanism that can not only handle high-bandwidth data transmission but also meet the security requirements of the data center.

Furthermore, many existing server management protocols have inherent limitations such as low bandwidth. Accordingly, these existing protocols lack the complexity and scalability required for modern data center management.

SUMMARY

The present technology can enable a high-bandwidth server management method by applying VLAN (Virtual Local Area Network). It employs an optimized RMCP (Remote Management Control Protocol) specification using a dual-pathway VLAN mechanism for data transmission. For example, a RMCP packet for intra-rack transmission is transmitted through an internal or secure VLAN pathway that does not require an authentication process, while a RMCP packet for inter-rack transmission is transmitted through an external or unsecure VLAN pathway that requires an authentication process, e.g. password verification. Accordingly, the present technology leverages the high-bandwidth of the RMCP specification while maintaining the authentication process only for necessary network traffic.

The present technology can enable a high-bandwidth server management method by applying VLAN (Virtual Local Area Network). It employs an optimized RMCP (Remote Management Control Protocol) specification using a dual-pathway VLAN mechanism for data transmission. For example, both the internal secure and external unsecure pathway require an authentication process, e.g. password verification. However, a RMCP packet for the intra-rack transmission is transmitted through an internal or secure VLAN pathway, which can use a predefined permanent password that is dedicated for a secure VLAN pathway transmission. Since the predefined password has a non-changeable value and is only used internally, it can function similar to a non-authentication process without changing the standard RMCP protocol stack.

According to some embodiments, the present technology may enable a network computing device to determine an appropriate VLAN pathway for a RMCP packet. The network computing device can identify the source address and the destinations address within the packet. For example, a switch can obtain the source address and the destination address in the MAC (Medium Access Control) header of the RMCP packet and determine whether the destination address is internal or external to the system. According to some embodiments, a software-defined switch can determine an appropriate VLAN pathway for a RMCP packet. For example, a software bridge built into a communication processor can be used to enable the present technology.

According to some embodiments, in addition to the source address and the destination address, the present technology can determine a VLAN pathway for the RMCP packet using other information such as port information associated with a packet.

According to some embodiments, a network computing device can comprise a VLAN converter that is configured to convert a non-VLAN RMCP packet to a VLAN RMCP packet pursuant to IEEE 802.1Q. According to some embodiments, the VLAN convert can also convert a VLAN RMCP packet to a non-VLAN RMCP packet.

Additionally, even though the present discussion uses RMCP as an example to enable high-bandwidth data transmission for remote server management, the present technology is conceptually applicable to other suitable secure network protocols, such as protocols compliant with REST (Representational State Transfer) or RMCP+.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Remote server management technology is widely adopted to enable a centralized and flexible server management for data centers. In remote server management, an administrator can use an external administration device (e.g. a computer) to monitor the operation status of a large number of servers through a network such as LAN (Local Area Network).

Among various remote server management technologies, out-of-band management has its unique advantages in flexibility and scalability. For example, out-of-band management allows an administrator to remotely manage servers regardless of whether the server's main CPU has power or whether the main operating system is functional. It can monitor or adjust BIOS (Basic Input/Output System) settings or monitor server's physical status such as temperature, voltage, and fan speed, etc. Out-of-band management is often enabled by independent hardware (e.g. BMC (Baseboard Management Controller) and other service satellite controllers) and its corresponding operation system that is compliant with a server controller management interface. For example, a popular server controller management interface is IPMI (Intelligent Platform Management Interface), which was introduced in the late 90's by various server manufactures.

An IPMI-compliant system can include a main controller such as BMC or RMC (Rack Management Controller) and other satellite controllers. An IPMI-compliant system can be managed by an administrator through a server management device in communication with the BMC and/or the RMC, which aggregates all network traffic within a server rack. Data transmission among the BMC and the satellite controllers can be either through an intra-rack (within one chassis or within one rack) data transmission or an inter-rack (between two or more racks, or between a rack and a server management device) data transmission. Additionally, other service controllers can be used pursuant to the present disclosure.

For example, in intra-rack data transmission, the satellite controllers within the same chassis connect to the BMC via the system interface called Intelligent Platform Management Bus/Bridge (IPMB), which is an enhanced implementation of I²C (Inter-Integrated Circuit). In inter-rack data transmission, the BMC connects to satellite controllers or another BMC in another rack via the Intelligent Platform Management Controller (IPMC) bus or bridge. It is often managed with the Remote Management Control Protocol (RMCP). Additionally, RMCP has an authentication process to ensure the data transmission security.

Both IPMB and RMCP mechanism have its unique advantages and disadvantages in different aspects of data transmission. For example, IPMB, as a message-based, hardware-level basic interface specification, has a limited bandwidth but is authentication free since it is intended for trusted internal communication; on the other hand, RMCP, as a specialized, UDP (User Datagram Protocol)-based specification, has a large bandwidth but requires an authentication process which can be complex and time consuming.

For example, a RMC often needs to pool server status data from each of the BMC using IPMB. Due to the limited IPMB bandwidth, the data pooling often takes substantial amount of time, rendering it unsuitable for managing a large number of server racks.

Thus, there is a need to improve the server management efficiency by improving bandwidth for intra-rack data transmission while maintaining the necessary authentication process.

The present technology discloses techniques that can enable a high-bandwidth and partially-authenticated data transmission mechanism for out-of-band management. It employs an optimized RMCP specification using a dual-pathway VLAN mechanism for data transmission, which is either internal or external to a server rack. A RMCP packet for intra-rack transmission is transmitted through an internal VLAN pathway that does not require an authentication process; a RMCP packet for inter-rack transmission is transmitted through an external VLAN pathway that requires an authentication process, e.g. password verification. Accordingly, the present technology leverages the high-bandwidth of the RMCP specification while maintaining the authentication feature of IPMI using VLAN.

The present technology can enable a high-bandwidth server management method by applying VLAN (Virtual Local Area Network). It employs an optimized RMCP (Remote Management Control Protocol) specification using a dual-pathway VLAN mechanism for data transmission. For example, both the internal secure and external unsecure pathway require an authentication process, e.g. password verification. However, a RMCP packet for the intra-rack transmission is transmitted through an internal or secure VLAN pathway, which can use a predefined permanent password that is dedicated for a secure VLAN pathway transmission. Since the predefined password has a non-changeable value and is only used internally, it can function similar to a non-authentication process without changing the standard RMCP protocol stack.

Although the present technology will be described primarily with respect to pathways that are internal or external to a server rack, the present technology is not limited in this regard. Rather, the present technology can be utilized for managing other server communications which occur, at times, over secure communications links and, at other times, over insecure communications links. Thus, the communications over the secure communications links can be treated the same as internal pathways and the communications over the insecure communications lines can be treated the same as external pathways.

VLAN (Virtual Local Area Network) can enable a group of network devices on different physical LAN segments to communicate with each other as if they were on the same physical LAN segment. Network devices and their respective network traffic can be mapped into VLAN groups using various types of mapping techniques, such as port-based VLAN mapping, MAC address-based VLAN mapping, or IP subnet-based VLAN mapping.

A commonly applied protocol to configure VLAN is IEEE 802.1Q, which involves tagging packets with a Tag Control Information field that identifies the VLAN pathway that the RMCP packet belongs to. According to the IEEE 802.1Q protocol, the Tag Control Information filed includes a 12-bit VLAN identifier field that enables VLAN pathways to be identified. Specifically, each individual VLAN pathway can implement different network policies, for example, to mandate network authentication, or, to transmit packets without authentication. Typically, VLAN is implemented through a network computing device such as a switch that has the VLAN functionality.

According to some embodiments, a network computing device such as a network switch can select an appropriate VLAN path way for a RMCP packet using the source address and the destinations address within a packet. Additionally, a BMC or a RMC can use a routing table to select an appropriate VLAN path way for a RMCP packet. For example, Linux can create a virtual network interface which can bind with VLAN. According to some embodiments, the system can enable a VLAN mapping that can include 1) eth1.1: internal secure VLAN and 2)

eth1.2: external unsecure VLAN. According to some embodiments, pursuant to the IP routing table, a RMC or a BMC can route a packet to eth1.1 (secure VLAN): using (1) un-authentication RMCP or (2) secure VLAN predefined permanent password for RMCP authentication. According to some embodiments, pursuant to the IP routing table, a RMC or a BMC can route a packet to eth1.2 (unsecure VLAN), using the RMCP authentication process. If the destination address is considered external to the source address (e.g. between a server rack and a server management device), the packet should be transmitted via the external VLAN pathway that requires an authentication process. However, if the destination is considered internal to the source address (e.g. within the same rack), the packet should then be transmitted via the internal VLAN pathway that does not require an authentication process. Then the switch can tag or convert the RMCP packet with the appropriate VLAN identifier (e.g. a 12-bit VLAN identifier field) and transmit the tagged RMCP packet via the appropriate VLAN pathway. Additionally, the switch can convert a VLAN-tagged RMCP packet to a regular RMCP packet if necessary. According to some embodiments, the present technology can determine a VLAN pathway for the RMCP packet using other information such as source/destination port information. For example, source port data and destination port data in the UDP header of a RMCP packet can be used to determine a VLAN pathway for the packet. If the packet is for intra-rack transmission, it is transmitted through the internal authentication-free VLAN pathway; if the packet is for inter-rack transmission, it is transmitted through an external authenticated VLAN pathway.

According to some embodiments, the present technology can use a service controller (e.g., BMC or RMC) to monitor the operation status of a server or a rack. For example, a baseboard management controller (BMC) is an independent and embedded microcontroller that, in some embodiments, is responsible for the management and monitoring of the main CPU, firmware and operating system. According to some embodiments, the BMC can monitor the server's hardware components by receiving data from sensors installed in the chassis, e.g., fan speeds, CPU temperature, power consumption level, etc. According to some embodiments, a RMC can aggregate network traffic within a server rack and communicate with a server management device, often via LAN.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more apparent from the following description and appended claims, or can be learned by the practice of the principles set forth herein.

Figure 1:
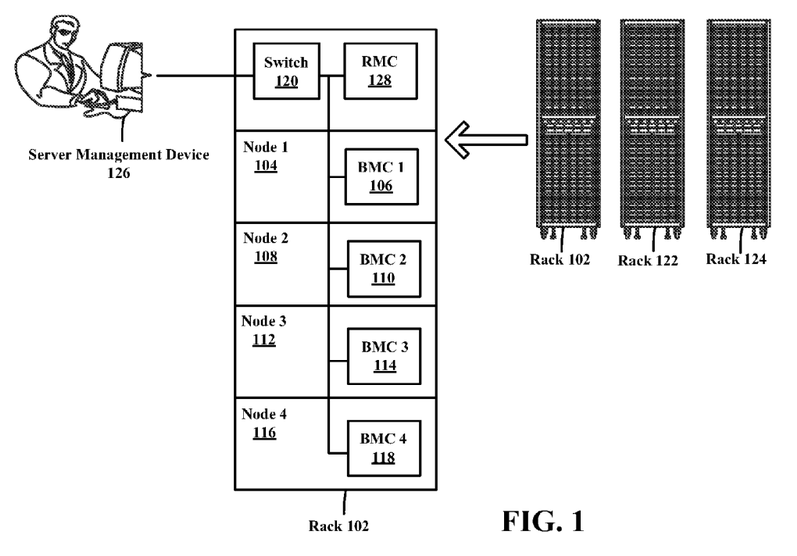
FIG. 1 illustrates an example of a VLAN remote server management system, according to some embodiments.

FIG. 1 illustrates an example of a VLAN remote server management system, according to some embodiments. According to some embodiments, an administrator can use a server management device 126 to remotely manage a data center (not shown) that includes many server racks (e.g. Rack 102, Rack 122 or Rack 124). For example, out-of-band management enables the administrator to remotely manage servers regardless of the main CPU's operation status. For example, when a server is crashed or loses power, out-of-band management can help the administrator to retrieve system error messages for diagnosis purpose. Additionally, the administrator can use IMPI messaging (e.g., RMCP messages) to monitor system status such as internal temperature, voltages, fan speeds, etc.

According to some embodiments, a rack 102 can comprise, for example, BMC 1 106 that manages Node 1 104, BMC 2 110 that manages Node 2 108, BMC 3 114 that manages Node 3 112 and BMC 4 118 that manages Node 4 116. Each of the BMCs can use RMCP messages to communicate with server management device 126. RMC 126, for example, can communicate with BMCs in Rack 102 and aggregate network communications internal or external to Rack 102. RMC 128 can also communicate with other RMCs associated with other racks, e.g. Rack 122 or Rack 124. Still referring to FIG. 1, Rack 102 can comprise Switch 120 (e.g. TOR (Top-of-Rack) switch) that is in communication with each computing node. Switch 120 simplifies data center design because it can be connected to an aggregation switch (not shown) using less cable or connecting nodes. According to some embodiments, Switch 120 can implement the VLAN server management system described herewithin.

For example, Switch 120 can determine an appropriate VLAN pathway for a RMCP packet using information, e.g. the source address and the destinations address, within a packet. According to some embodiments, Switch 120 can obtain the source address and the destination address in the MAC header of the RMCP packet and determine whether the destination address is internal or external to the rack 102.

For example, when a RMCP packet is generated by BMC 1 106 with a source MAC address and to be sent to BMC 2 110 with a destination MAC address, the data transmission is considered internal to Rack 102. On the other hand, when a RMCP packet is generated by BMC 1 106 and to be sent to Server Management Device 126, the data transmission is considered to be external to Rack 102.

After the analysis, Switch 120 can accordingly tag the RMCP packet with either an internal VLAN identifier or an external VLAN identifier in the 12-bit VLAN identifier field. Additionally, the internal VLAN identifier corresponds to an internal VLAN pathway that does not require an authentication process. The external VLAN identifier corresponds to an external VLAN pathway that requires an authentication process (e.g. verification of a BMC password). Lastly, Switch 120 can transmit the tagged RMCP packet via the corresponding VLAN pathway to its destination address.

Thus, the VLAN remote server management system can leverage the high bandwidth of the RMCP specification, while keeping the authentication process for selected data transmissions. For example, the VLAN remote server management system can segment network traffic to different VLAN pathways.

Figure 2:
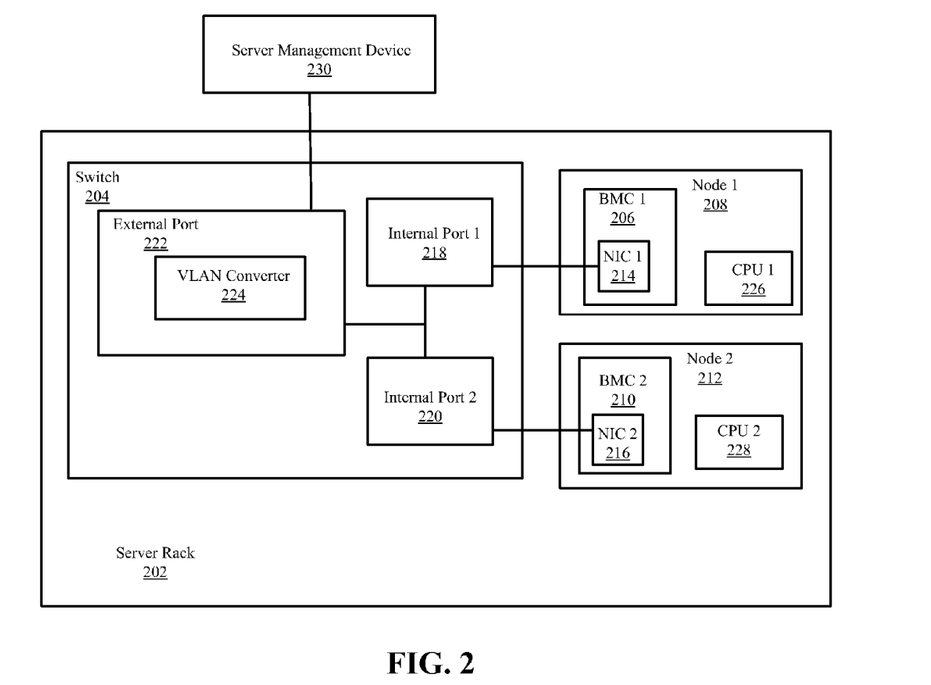
FIG. 2 is a block diagram illustrating an example of a VLAN remote server management system, according to some embodiments.

FIG. 2 is a block diagram illustrating an example of a VLAN remote server management system, according to some embodiments. As shown in FIG. 2, Server Rack 202 can at least comprise Switch 204 and a group of computing nodes including Node 1 208 and Node 2 212. Switch 204 can regulate network traffic Node 1 208 and Node 2 212. Switch 204 can connect to Server Management Device 230 via a dedicated network interface. According to some embodiments, each computing node can comprise a main CPU and a service controller that is independent form the main CPU.

For example, Node 1 208 can include CPU 1 226 and its service controller BMC 1 208, which further comprises a dedicated NIC 1 214 (Network Interface Controller). NIC 1 214 is assigned with a unique MAC address for network traffic routing. Similarly, Node 2 212 can include CPU 2 228 and its service controller BMC 2 210, which comprises a dedicated NIC 2 216 with a unique MAC address.

According to some embodiments, service controller BMC 1 208 can be an embedded and independent microprocessor that has an operating system (e.g., IPMI) different from CPU 1 226 (e.g., LINUX). Service controller BMC 1 208 can have a power supply separate from CPU 1 226. According to some embodiments, service controller BMC 1 208 can receive server performance data through numerous sensors (e.g. thermometer, power meter, etc.) and transmit these data to Server Management Device 230 via Switch 224.

Still referring to FIG. 2, Switch 204 can comprise a group of internal ports that can communicate with a NIC of a BMC. For example, Internal Port 1 218 can handle network traffic associated with NIC 1 214 of BMC 1 206; Internal Port 2 220 can handle network traffic associate with NIC 2 216 of BMC 2 210. According to some embodiments, Switch 204 can further comprise at least one External Port 222 configured to communicate with the internal ports and any network devise external to Server Rack 202, e.g. Server Management Device 230 or another server rack (not shown). Additionally, accordingly to some embodiments, External Port 222 can further comprise VLAN Converter 224 operable to convert a RMCP packet to a VLAN packet. According to some embodiment, VLAN Converter 224 can also convert a VLAN packet to a RMCP packet.

According to some embodiments, Server Management Device 230 can query BMC 1 206 via RMCP messaging, for example, for a CPU temperature data. In response to the query, BMC 1 206 can generate a RMCP packet having a payload including the CPU temperature data and transmit the packet to Switch 206, for example, via Internal Port 1 218. The RMCP packet can further comprise network pathway information, such as the source MAC address and the destination MAC address in the MAC header.

After receiving the RMCP packet having a payload including the CPU temperature data, Switch 204 can determine an appropriate VLAN pathway for the packet using embedded pathway information, e.g. the source MAC address and the destinations MAC address. According to some embodiments, Switch 204 can identify the source MAC address and the destination MAC address in the MAC header of the RMCP packet and determine whether the destination address is internal or external to Server Rack 202. For example, because the network path of the RMCP packet generated by BMC 1 206 has a destination MAC address of Server Management Device 230, it is considered external to Server Rack 202.

After determine the RMCP packet is external, Switch 204 can accordingly tag the RMCP packet with an external VLAN identifier, for example, in the 12-bit VLAN identifier field per the IEEE 802.1Q protocol. Additionally, the external VLAN identifier corresponds to an external VLAN pathway that requires an authentication process (e.g. verification of a BMC password). Lastly, Switch 204 can transmit the tagged RMCP via the external VLAN pathway to Server Management Device 230.

According to some embodiments, BMC 1 206 can generate a RMCP packet for BMC 2 210, for example, a RMCP packet having a payload data of a voltage data. Besides the payload data, the RMCP packet can comprise network pathway information, such as BMC 1 206 MAC address as the source address and BMC 2 210 MAC address as the destination address.

After receiving the RMCP packet, Switch 204 can determine an appropriate VLAN pathway for the packet. Switch 204 can identify embedded pathway information, e.g. BMC 1 206 MAC address as the source address, and BMC 2 210 MAC address as the destination address. For example, the network path of the RMCP packet generated by BMC 1 206 with a destination MAC address of BMC 2 210 MAC is considered internal.

After determining the RMCP packet is internal, Switch 204 can accordingly tag the RMCP packet with an internal VLAN identifier. Additionally, the internal VLAN identifier corresponds to an internal VLAN pathway that does not require an authentication process (e.g. verification of a BMC password). Lastly, Switch 204 can transmit the tagged RMCP packet including the voltage data via the internal VLAN pathway to BMC 2 210.

Figure 3:
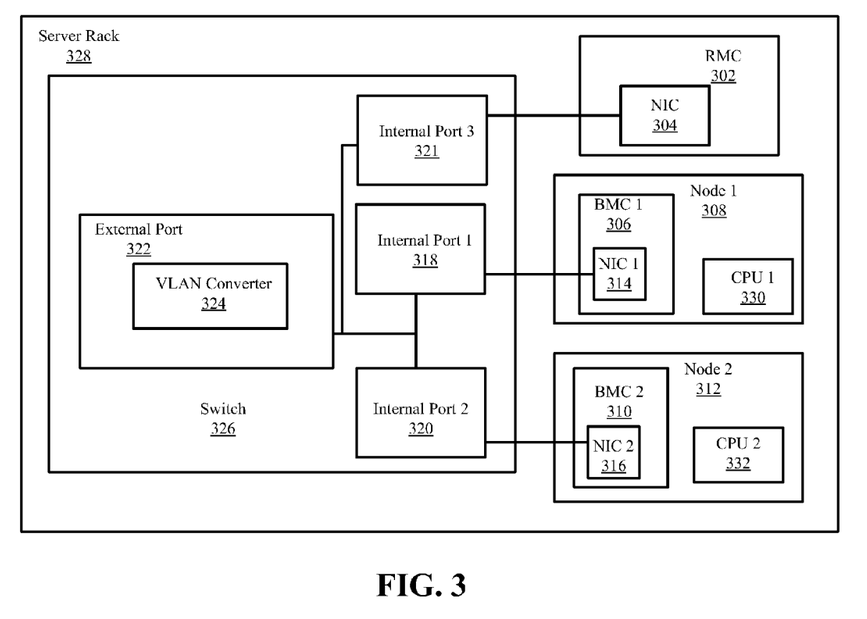
FIG. 3 is another block diagram illustrating an example of a VLAN remote server management system with a RMC (Rack Management Controller), according to some embodiments.

FIG. 3 is a block diagram illustrating another example of a VLAN remote server management system with a RMC (Rack Management Controller) or a CMC (Chassis Management Controller) for routing and managing data communication between the different nodes internal or external to Server Rack 328, according to some embodiments. According to some embodiments, RMC 302 can be an embedded and independent microprocessor that is designed to manage one or more chassis of Server Rack 328. According to some embodiments, a Server Management Device (not shown) can perform specific system functions such as pulling system update, change settings, or opening a remote console session, from RMC 302 interface, instead of the distributed BMC interfaces. Additionally, RMC 302 can enable backing up system settings or adjusting BIOS settings to Server Rack 328.

As shown in FIG. 3, Server Rack 328 can at least comprise Switch 326 and a group of computing nodes including Node 1 308 and Node 2 312. According to some embodiments, Switch 326 can directly regulate network traffic of Node 1 308 and Node 2 312. According to some embodiments, Switch 326 can regulate network traffic of Node 1 308 and Node 2 312 through RMC 302. Switch 326 can communicate with a Server Management Device (not shown) via a dedicated network interface.

According to some embodiments, each computing node can comprise a main CPU and a service controller that is independent form the main CPU. For example, Node 1 308 can include CPU 1 330 and its service controller BMC 1 306, which further comprises a dedicated NIC 1 314 (Network Interface Controller). NIC 1 314 is assigned with a unique MAC address for network traffic routing. Similarly, Node 2 312 can include CPU 2 332 and its service controller BMC 2 310, which comprises a dedicated NIC 2 316 with a unique MAC address. Additionally, RMC 302 can comprise NIC 304 with a unique MAC address.

According to some embodiments, BMC 1 306 can be an embedded and independent microprocessor that has an operating system (e.g., an IPMI-compliant operation system) different from CPU 1 330 (e.g., LINUX).

According to some embodiments, RMC 302 can be an embedded and independent microprocessor that is designed to manage one or more chassis of Server Rack 328. According to some embodiments, Server Management Device (not shown) can perform specific system functions such as pulling system update, change settings, or opening a remote console session, from the RMC 302 interface, instead of the distributed BMC interfaces. Additionally, RMC 302 can enable backing up system settings or adjusting BIOS settings to Server Rack 328. RMC 302 can communicate with Internal Port 3 321 associated with Switch 326.

Still referring to FIG. 3, Switch 326 can comprise a group of internal ports each configured to communicate with a NIC of a BMC or a RMC. For example, Internal Port 1 318 is operable to handle network traffic associated with NIC 1 314 of BMC 1 306; Internal Port 2 320 is operable to handle network traffic associated with NIC 2 316 of BMC 2 310. For example, Internal Port 1 318 and Internal Port 2 320 can respectively communicate with NIC 304 of RMC 302. According to some embodiments, Switch 326 can further comprise at least one External Port 322 configured to communicate with the internal ports and any network devise external to Server Rack 328, e.g. a server management device or another server rack. Additionally, External Port 322 can further comprise VLAN Converter 324 that can convert a RMCP packet to a VLAN packet. According to some embodiments, VLAN Converter 324 can also convert a VLAN packet to a RMCP packet.

According to some embodiments, a Server Management Device (not shown) can query BMC 1 306 via RMCP messaging, for example, for a CPU temperature data. In response to the query, BMC 1 306 can generate a RMCP packet including the CPU temperature data and transmit the packet to Switch 326, for example, via Internal Port 1 318. The RMCP packet can further comprise network pathway information, such as the source MAC address and the destination MAC address in the MAC header. According to some embodiment, the RMCP packet can be routed through RMC 302, which can communicate with the Server Management Device.

After receiving the RMCP packet including the CPU temperature data, either through BMC 306 or RMC 302, Switch 326 can determine an appropriate VLAN pathway for the packet using embedded pathway information, e.g. the source MAC address and the destinations MAC address. According to some embodiments, Switch 326 can identify the source MAC address and the destination MAC address in the MAC header of the RMCP packet and determine whether the destination address is internal or external to Server Rack 328. For example, because the RMCP packet has a destination MAC address associated with a server management device, its pathway is considered external to Server Rack 328.

After determining the RMCP packet is external, Switch 326 can accordingly tag or convert the RMCP packet with an external VLAN identifier. For example, VLAN converter 324 can tag or convert the RMCP packet with an external VLAN identifier. Additionally, the external VLAN identifier corresponds to an external VLAN pathway that requires an authentication process (e.g. verification of a BMC password). Lastly, Switch 326 can transmit the tagged RMCP packet including the CPU temperature data via the external VLAN pathway to a server management device identified with the source MAC address.

According to some embodiments, BMC 1 306 can generate a RMCP packet for BMC 2 310, for example, a RMCP packet having a payload data of a voltage data. Besides the payload data, the RMCP packet can comprise network pathway information, such as BMC 1 306 MAC address as the source address and BMC 2 310 MAC address as the destination address.

After receiving the RMCP packet, Switch 326 can determine an appropriate VLAN pathway for the packet using embedded pathway information, e.g. BMC 1 306 MAC address as the source address, and BMC 2 310 MAC address as the destination address. For example, the network path of the RMCP packet with a destination MAC address of BMC 2 310 MAC is internal.

After determine the RMCP packet is internal, Switch 326 can accordingly tag or convert the RMCP packet with an internal VLAN identifier, for example, in the 12-bit VLAN identifier field. For example, VLAN converter 324 can tag or convert the RMCP packet with an internal VLAN identifier. Additionally, the internal VLAN identifier corresponds to an internal VLAN pathway that does not require an authentication process (e.g. verification of a BMC password). Lastly, Switch 326 can transmit the tagged RMCP packet including the voltage data via the internal VLAN pathway to BMC 2 310.

Figure 4:
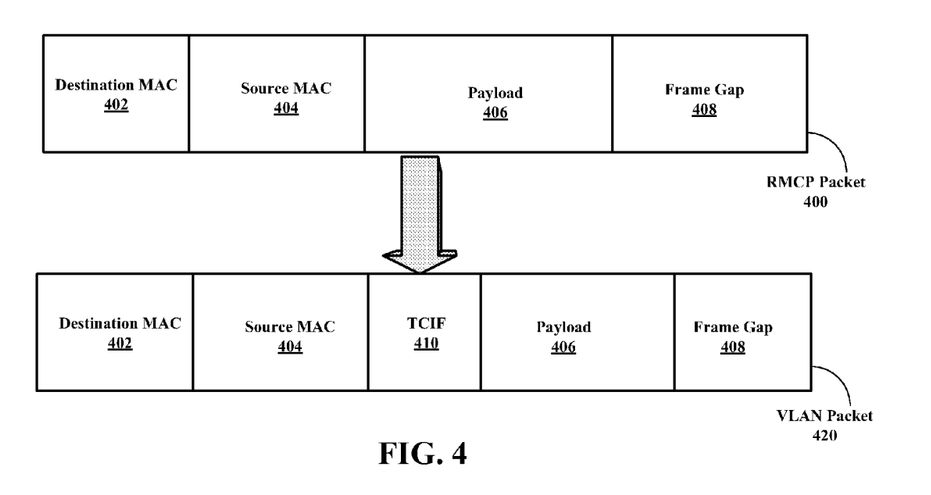
FIG. 4 is an example of converting a regular Ethernet packet to a VLAN packet, according to some embodiments.

FIG. 4 is an example of converting a regular Ethernet packet such as RMCP packet 400 to VLAN packet 420, according to some embodiments. IEEE 802.1Q is the VLAN tagging specification and enables the tagging mechanism. As shown in FIG. 4, a non-VLAN packet, such as RMCP packet 400, comprises, for example, a MAC address header that includes Destination MAC 402 and Source MAC 404, Payload 406, and Frame Gap 408. After the VLAN tagging, VLAN Packet 420 comprises, for example, a MAC address header including Destination MAC 402 and Source MAC 404, Tag Control Information Field 410 (a 12-bit VLAN identifier field), Payload 406 and Frame Gap 408. can be tagged between two existing fields such as Source Mac 404 and Payload 406. Additionally, the packet tagging or converting per IEEE 802.1Q is well-known for those familiar in the art.

Furthermore, TCIF (Tag Control Information Field) 410 can further indicate a specific VLAN pathway for the packet so that network traffic can be segmented into different VLAN pathways. For example, TCIF 410 can comprise a VLAN ID indicating the pathway is internal or external. Accordingly, the VLAN packet can be routed through a authentication-free VLAN or a authenticated VLAN.

According to some embodiments, a VLAN converter can tag or convert the non-VLAN packet to a VLAN packet. Conversely, a VLAN convert can un-tag or convert a VLAN packet to a non-VLAN packet.

Figure 5:
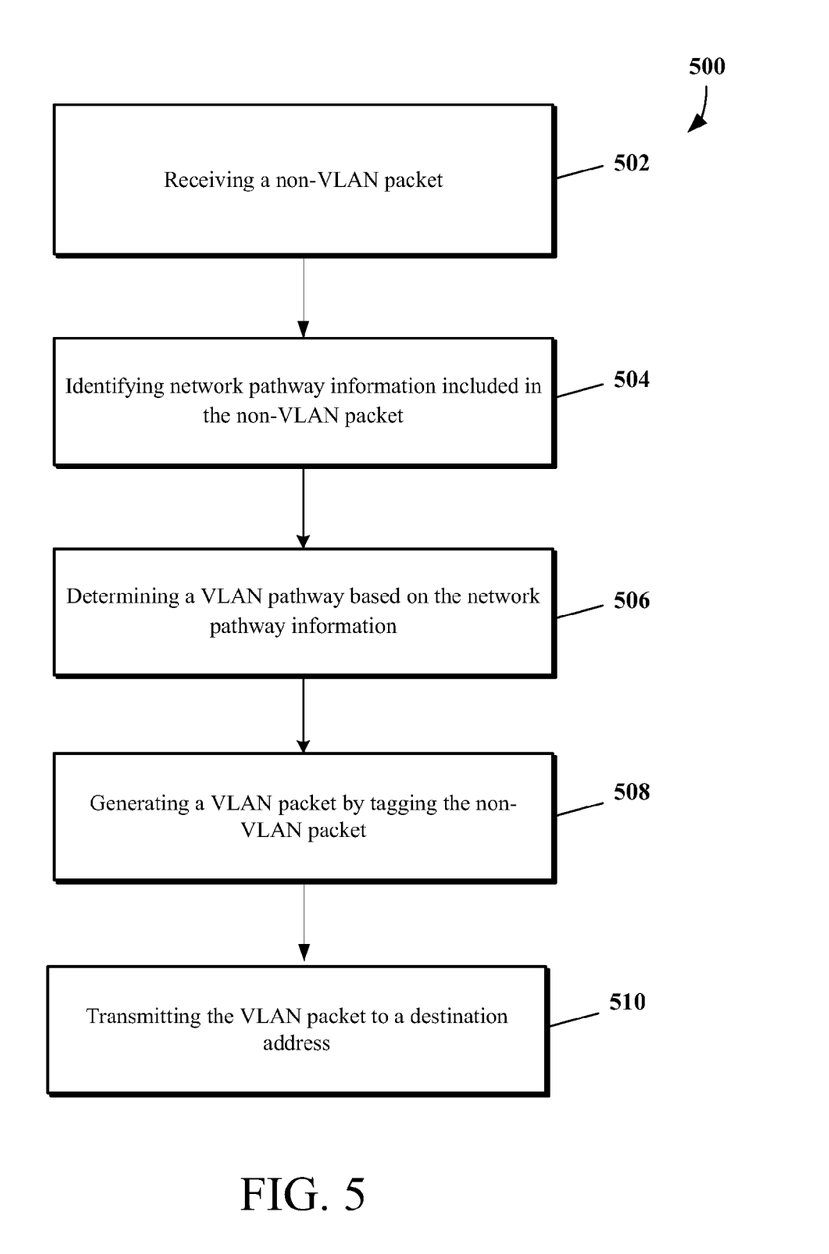
FIG. 5 is an example flow diagram for the VLAN remote server management system, according to some embodiments.

FIG. 5 is an example flow diagram for the VLAN remote server management system, according to some embodiments. It should be understood that there can be additional, fewer, or alternative steps performed in similar or alternative orders, or in parallel, within the scope of the various embodiments unless otherwise stated. At step 502, a network switch can receive a non-VLAN packet. For example, the network switch can receive a RMCP packet from a BMC in communication with the network device.

At step 504, the network device can identify network pathway information included in the non-VLAN packet. For example, a destination address within a MAC address header of the RMCP packet can indicate a destination computing device for the packet.

At step 506, the network device can determine a VLAN pathway based on the identified network pathway information. For example, a destination address associated with another BMC in communication with the network device can indicate the data transmission is internal. Thus, the network device can choose an internal VLAN pathway for the packet.

At step 508, the network device can generate a VLAN packet by tagging the non-VLAN packet. For example, a VLAN converter of the network device can convert or tag the RMCP packet to a VLAN packet pursuant to IEEE 802.1Q. Additionally, the VLAN packet can comprise a VLAN identifier for the designated VLAN pathway, for example, an internal VLAN pathway.

At step 510, the network device can transmit the VLAN packet by the designated VLAN pathway. For example, the network device can transmit the VLAN packet via an internal VLAN pathway that does not require an authentication process.

Figure 6:
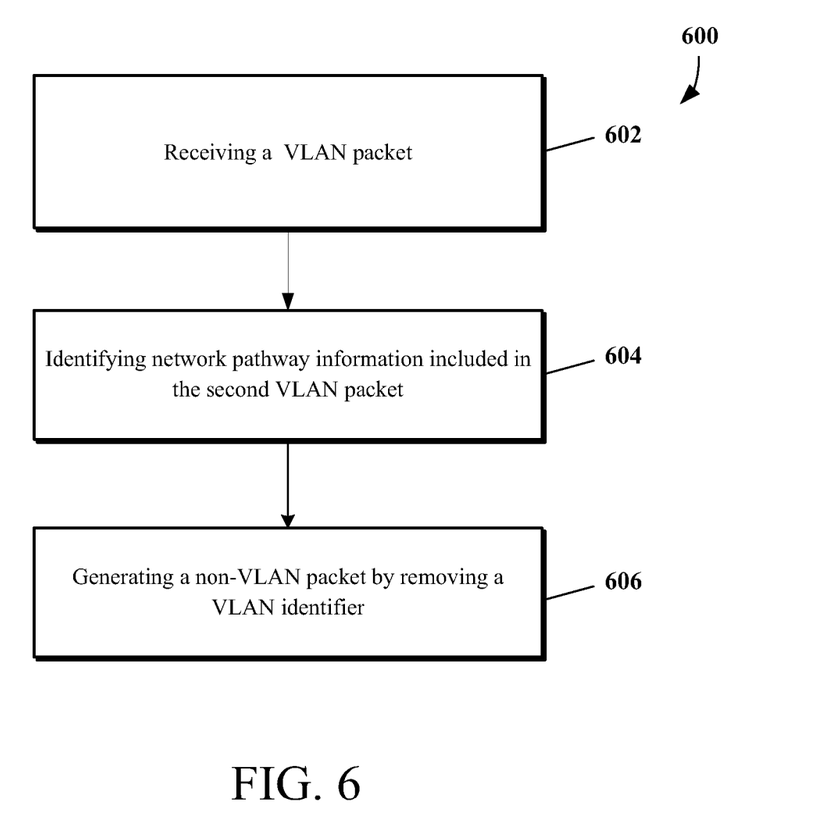
FIG. 6 is another example flow diagram for VLAN remote server management system, according to some embodiments.

FIG. 6 is another example flow diagram for VLAN remote server management system, according to some embodiments. It should be understood that there can be additional, fewer, or alternative steps performed in similar or alternative orders, or in parallel, within the scope of the various embodiments unless otherwise stated. At step 602, a network device can receive a VLAN packet. For example, a network device can receive a VLAN packet with a destination address associated with a server management device.

At step 604, the network device can identify network pathway information included in the VLAN packet. For example, the network device can identify the designation address in the packet.

At step 606, the network device can generate a non-VLAN packet based on the VLAN packet. For example, the VLAN converter associated with the network device can untag or convert the VLAN packet to the non-VLAN packet.

Figure 7:
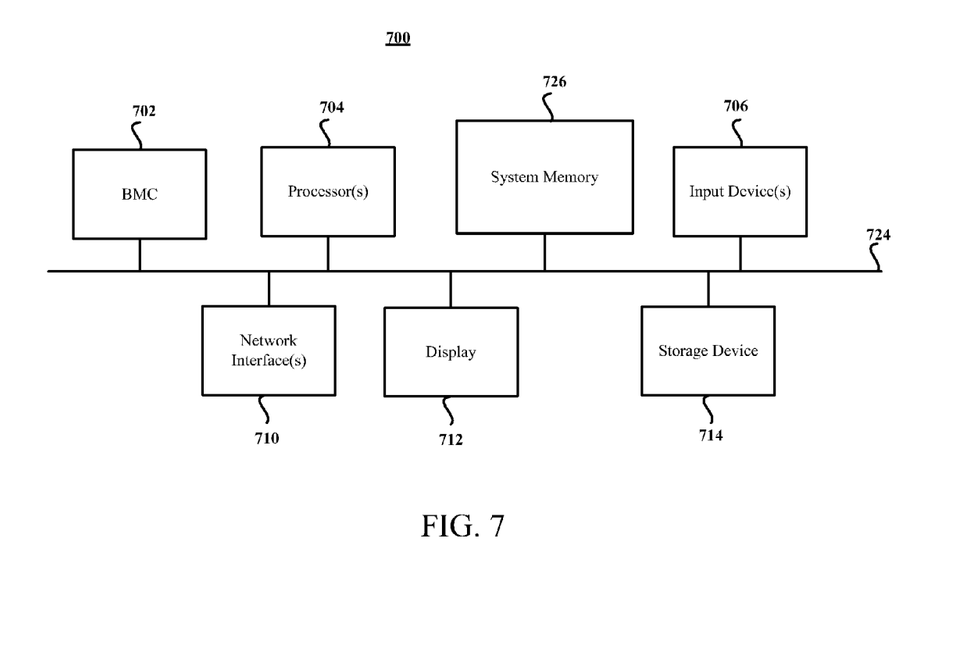
FIG. 7 illustrates a computing platform of a computing device, according to some embodiments.

FIG. 7 illustrates an example system architecture 700 for implementing the systems and processes of FIGS. 1-6. Computing platform 700 includes a bus 724 which interconnects subsystems and devices, such as: service controller 702, processor 704, storage device 714, system memory 726, and a network interface(s) 7108. Processor 704 can be implemented with one or more central processing units ("CPUs"), such as those manufactured by Intel® Corporation—or one or more virtual processors—as well as any combination of CPUs and virtual processors. Computing platform 700 exchanges data representing inputs and outputs via input-and-output devices input devices 706 and display 712, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 700 performs specific operations by processor 704, executing one or more sequences of one or more instructions stored in system memory 726. Computing platform 700 can be implemented as a server device or client device in a client-server arrangement, peer-to-peer arrangement, or as any mobile computing device, including smart phones and the like. Such instructions or data may be read into system memory 726 from another computer readable medium, such as storage device 714. In some examples, hard-wired circuitry may be used in place of or in combination with software instructions for implementation. Instructions may be embedded in software or firmware. The term "computer readable medium" refers to any tangible medium that participates in providing instructions to processor 704 for execution. Such a medium may take many forms, including, but not limited to, non-volatile media and volatile media. Non-volatile media includes, for example, optical or magnetic disks and the like. Volatile media includes dynamic memory, such as system memory 726.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 724 for transmitting a computer data signal.

In the example shown, system memory 726 can include various modules that include executable instructions to implement functionalities described herein. In the example shown, system memory 726 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
receiving, at a network switch, a non-Virtual Local Area Network (VLAN) packet, the network switch being operable to communicate with one or more internal computing devices of a rack system and at least one external computing device of the rack system, the non-VLAN packet is a remote management control protocol (RMCP) packet;
determining a VLAN pathway for the RMCP packet based at least in part on network pathway information in the RMCP packet, wherein the VLAN pathway is one of an external pathway or an internal pathway, wherein the external Virtual LAN pathway requires an authentication process for data transmission, and wherein the internal VLAN pathway does not require an authentication process for data transmission;
in response to determining that the VLAN pathway is the external pathway, converting the RMCP packet to a VLAN packet by tagging the RMCP packet with a VLAN identifier, the VLAN identifier corresponding to the VLAN pathway and indicating whether the VLAN pathway is internal or external of the rack system; and
transmitting, via the VLAN pathway, the VLAN packet to a destination address associated with the at least one external computing device.

2. The method of claim 1, wherein the destination address being associated with one of the one or more internal computing devices and one of the at least one external computing device.

3. The method of claim 1, wherein the network pathway information comprises the destination address.

4. The method of claim 3, wherein the network pathway information further comprises a source address.

5. The method of claim 1, further comprising:
receiving, at the network switch, a second VLAN packet;
identifying network pathway information included in the second VLAN packet; and
generating a second non-VLAN packet by removing a VLAN identifier embedded in the second VLAN packet.

6. A system, comprising:
a processor; and
a memory device including instructions that, when executed by the processor, cause the system to:

receive, at a network device, a non-Virtual Local Area Network (VLAN) packet, the network switch being operable to communicate with one or more internal computing devices of a rack system and at least one external computing device of the rack system, the non-VLAN packet is a remote management control protocol (RMCP) packet;

determine a VLAN pathway based at least in part on network pathway information in the RMCP packet, the VLAN pathway is one of an external pathway or an internal pathway, wherein the external Virtual LAN pathway requires an authentication process for data transmission, and wherein the internal VLAN pathway does not require an authentication process for data transmission;

in response to determining that the VLAN pathway is the external pathway, converting the RMCP packet to a VLAN packet by tagging the RMCP packet with a VLAN identifier, the VLAN identifier being corresponding to the VLAN pathway and indicating whether the VLAN pathway is internal or external of the rack system; and transmit, via the VLAN pathway, the VLAN packet to a destination address associated with the at least one external computing device.

7. The system of claim 6, further comprising:

receive a second VLAN packet;

identify network pathway information included in the second VLAN packet; and generate a second non-VLAN packet by removing a VLAN identifier embedded in the second VLAN packet.

8. The system of claim 6, wherein the network pathway information comprises the destination address and a source address.

9. The system of claim 6, wherein the network device comprises a plurality of ports operable to communicate with the one or more internal computing devices and the at least one external computing device.

10. The system of claim 6, wherein the network device comprises a VLAN converter operable to generate the VLAN packet.

11. A non-transitory computer-readable storage medium storing instructions, the instructions when executed by a processor causing the processor to:

receive, at a network device, a non-Virtual Local Area Network (VLAN) packet, the network switch being operable to communicate with one or more internal computing devices of a rack system and at least one external computing device of the rack system, the non-VLAN packet is a remote management control protocol (RMCP) packet;

determine a VLAN pathway based at least in part on network pathway information in the RMCP packet, the VLAN pathway is one of an external pathway or an internal pathway, wherein the external Virtual LAN pathway requires an authentication process for data transmission, and wherein the internal VLAN pathway does not require an authentication process for data transmission;

in response to determining that the VLAN pathway is the external pathway, converting the RMCP packet to a VLAN packet by tagging the RMCP packet with a VLAN identifier, the VLAN identifier being corresponding to the VLAN pathway and indicating whether the VLAN pathway is internal or external of the rack system; and transmit, via the VLAN pathway, the VLAN packet to a destination address associated with the at least one external computing device.

12. The non-transitory computer-readable storage medium of claim 11, wherein the destination address being associated with one of the one or more internal computing devices and one of the at least one external computing device.

13. The non-transitory computer-readable storage medium of claim 11, wherein the network pathway information comprises the destination address and a source address.

14. The non-transitory computer-readable storage medium of claim 11, wherein the network device comprises a VLAN converter operable to generate the VLAN packet.

15. The non-transitory computer-readable storage medium of claim 14, wherein the VLAN converter is further operable to convert the VLAN packet to a non-VLAN packet.

* * * * *